May 25, 1965  D. L. LOMBARD  3,185,770
RECORDING APPARATUS

Filed Feb. 23, 1962  5 Sheets-Sheet 1

INVENTOR.
DANIEL L. LOMBARD
BY
Murray & Young
his ATTORNEYS

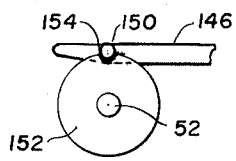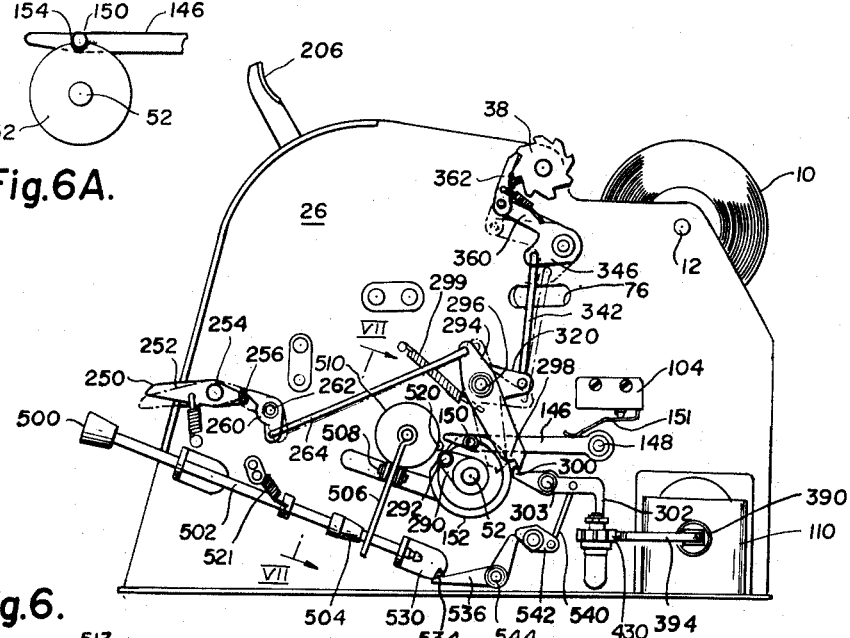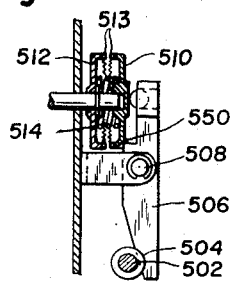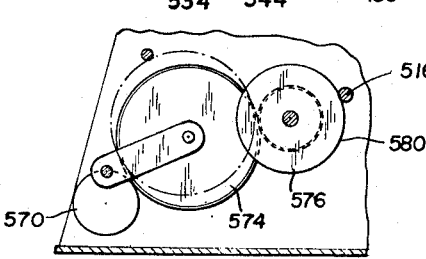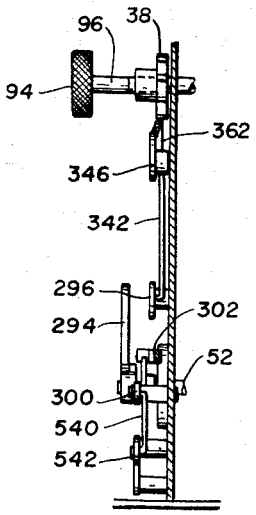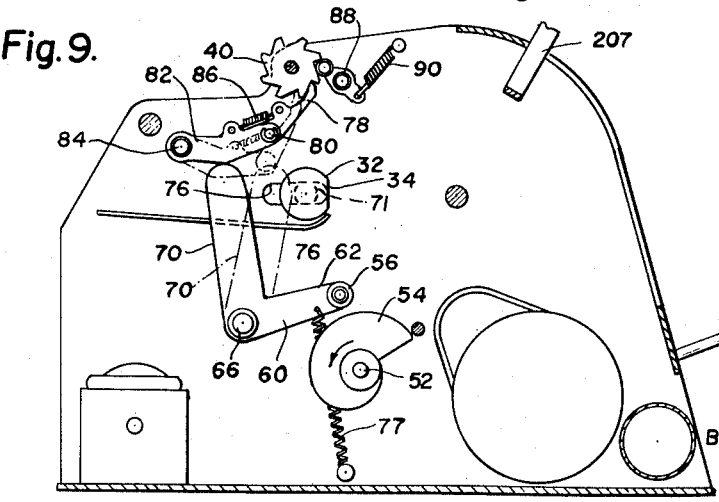

May 25, 1965 D. L. LOMBARD 3,185,770
RECORDING APPARATUS
Filed Feb. 23, 1962 5 Sheets-Sheet 5
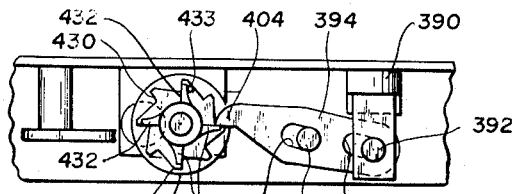
Fig.11.
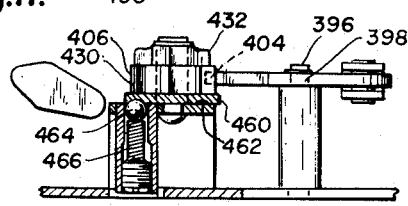
Fig.12.
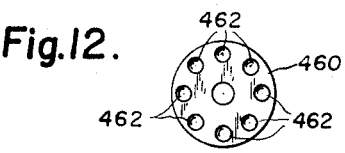
Fig.13.
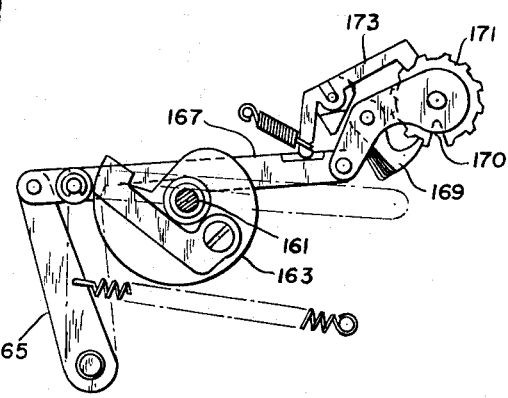
Fig.14.
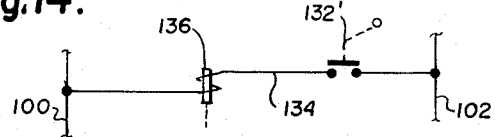
Fig.15.
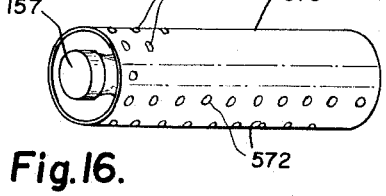
Fig.16.
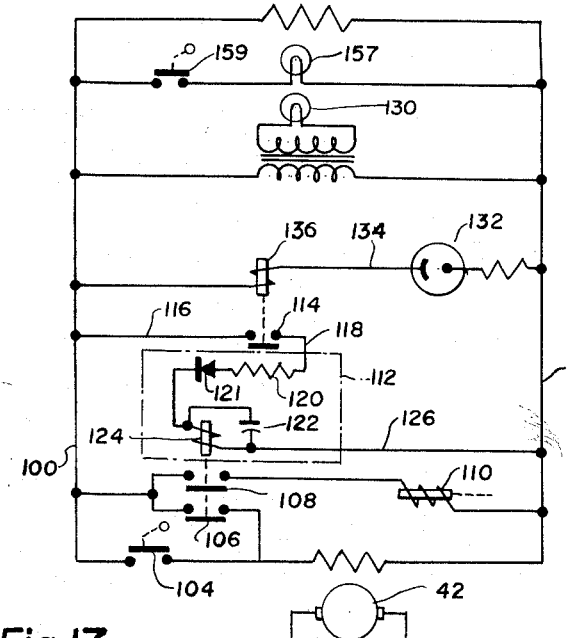
Fig.17.
Fig.18
INVENTOR.
DANIEL L. LOMBARD
BY
*Murray & Young*
his ATTORNEYS

United States Patent Office 3,185,770
Patented May 25, 1965

3,185,770
RECORDING APPARATUS
Daniel L. Lombard, Pittsburgh, Pa.
(639 Wick Ave., P.O. Box 177, Youngstown, Ohio)
Filed Feb. 23, 1962, Ser. No. 175,026
11 Claims. (Cl. 179—7.1)

This invention relates to a recording apparatus and more specifically to a recording apparatus for automatically maintaining an accurate record of the time, duration, destination and the like of telephone usage. It should be understood however that the invention is not limited to record-keeping in combination with any particular device such as a telephone, since the apparatus can be fitted conveniently to other office equipment or to equipment in general where it is desired to maintain an accurate and detailed record of usage of a particular piece of equipment. The invention has, however, special application for telephone usage because the type of information which the apparatus provides can be in the form of times of making telephone calls, frequency of telephone usage, duration of calls, destination, etc., information which is very useful in maintaining a record of charges and costs in business operations of various kinds.

A substantial cost of doing business involves communications, this cost including not only the out-of-pocket expense of standard phone rates and long distance toll charges, but also the time spent by personnel in making or receiving telephone calls. In order to determine the efficiency of personnel, as well as forming a basis for establishing charges, it is necessary to maintain an accurate and detailed record of telephone usage which will provide information as to the nature and extent of each telephone usage.

It has also been found that casual and unprepared usage of the telephone for long distance calls can be expensive and it is one of the underlying purposes of the present invention to provide an automatic device which, by reason of its record keeping, acts as a deterrent to careless usage of the telephone for long distance tolls.

One of the objects of the present invention is to provide an apparatus which can be easily installed upon a standard desk telephone to provide a continuous, accurate and meaningful collection of data relative to each telephone usage.

A further object of the invention is to provide an apparatus which will record data on telephone usage from which toll charge and party can be readily identified to form a basis of costing records.

A further object of the invention is to provide a continuously running, automatically-operating device which will provide information necessary for telephone usage and is yet compact and unobtrusive to form a part of the desk furniture and which can also serve as a desk clock. The device is functional yet aesthetically acceptable.

It is another object of the invention to provide an apparatus for recording data on telephone usage which is easy to manipulate to record a specific telephone usage and the details thereof, as to party, location, etc. and which will be automatically returned to a neutral or normal position when the call is completed, thus precluding the possibility of misidentifying a particular telephone call.

It is a further object of the invention to provide an apparatus for recording telephone usage which will provide data useful both in local and long distance telephone call usage.

A further object of the invention is to provide a visual means which provides the telephone user with an idea of approximately how long he has continued a long distance call so that he does not lose sight of the involved expense. This time record feature encourages the user to be brief in long distance calls. The savings in this regard alone are sufficient to offset the cost of the device.

Consequently, the apparatus is useful not only for forming an accurate basis for expense records but also stimulates economy and provides the efficiency-minded user with an accurate tool in determining whether he is using his time most wisely.

Other objects of the invention relate to novel adjusting mechanism forming a part of the apparatus whereby the timepiece portion of the apparatus can be easily adjusted as to the month, day, minute, hour, etc. without disturbing the internal clock works of the apparatus and thus making for a very accurate timepiece which is both attractive and reliable.

Another object of the invention is the novel usage of a so-called "one-use" carbon paper which is stamped by the printing members of the apparatus with the month, day, A.M.-P.M., hour and minute, party, destination, etc. of a particular telephone call so that a permanent record is attainable in printed form by merely clamping the one use carbon paper against a line of type having characters which provide the foregoing information.

Other objects and features of the invention will become apparent from a consideration of the following description, which proceeds with reference to the accompanying drawings, wherein.

Figure 2:
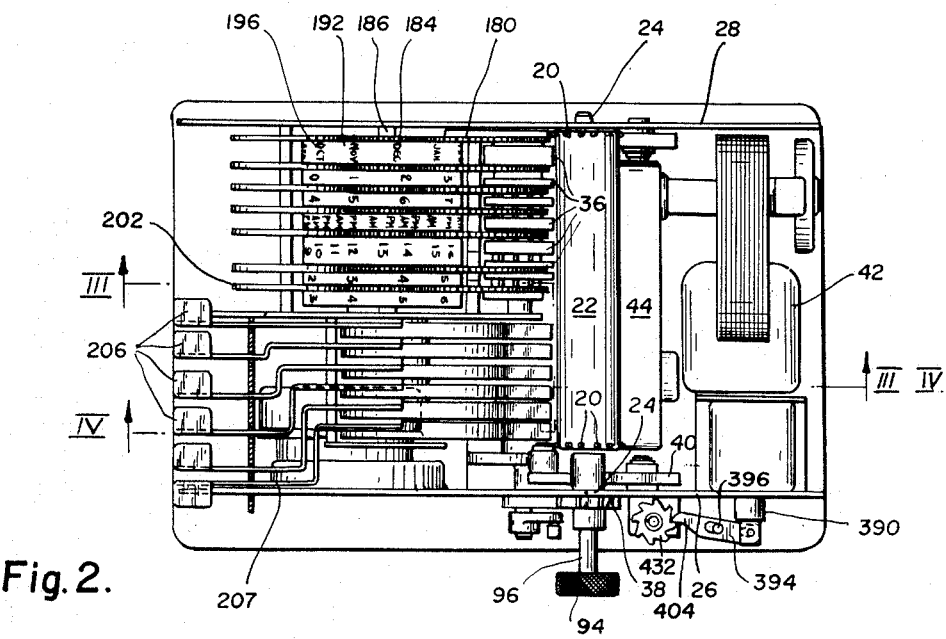
FIG. 2 is a top view of the apparatus but with the cover removed to show the interior of the apparatus.
Figure 3:
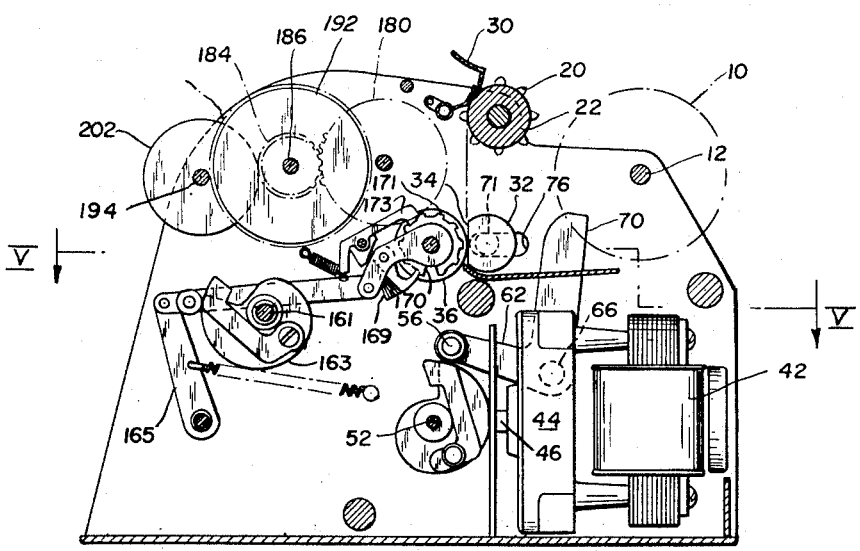
Figure 5:
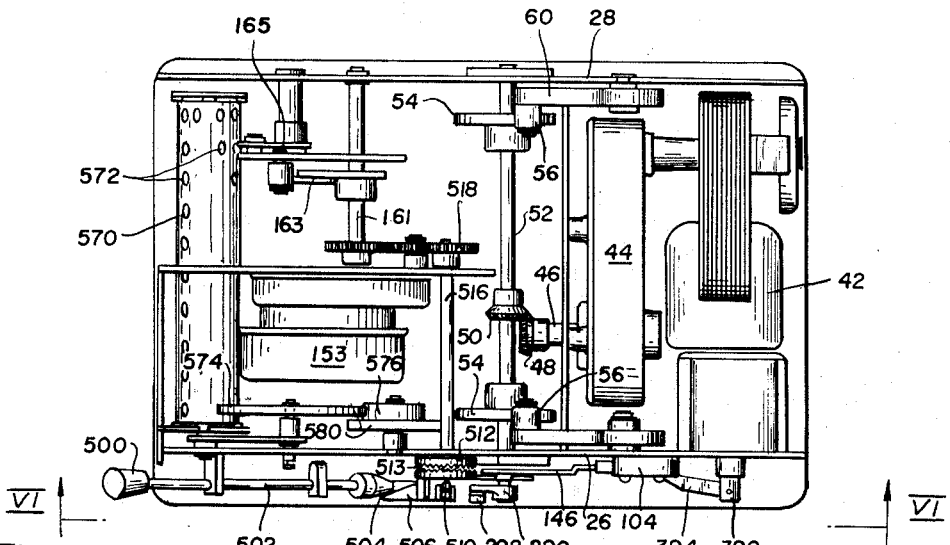
Figure 4:
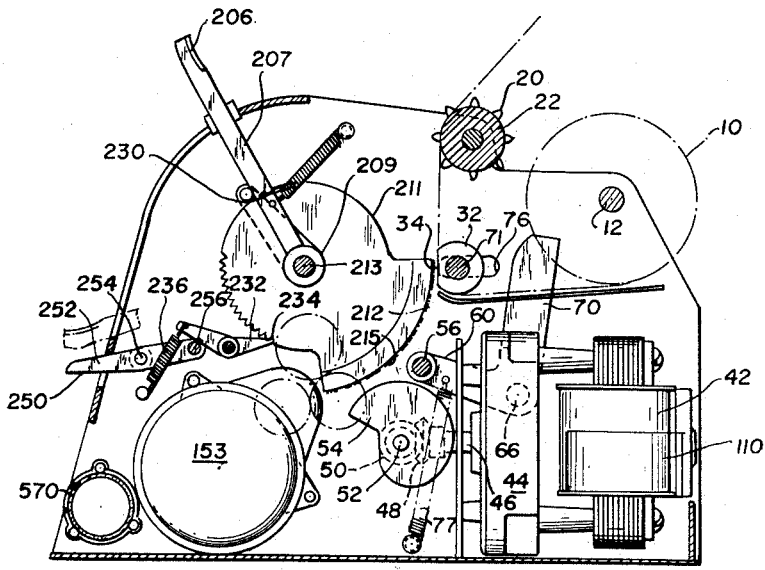

FIGS. 3 and 4 are section views taken on lines 3—3 and 4—4 of FIG. 2;

FIG. 5 is a section view taken on line 5—5 of FIG. 3;

FIG. 6 is a side elevation view of the apparatus looking in the direction of the arrows 6—6 in FIG. 5 with the side cover removed to illustrate the long distance mechanism;

FIG. 6A is an isolated view of the mechanism used for actuating a switch controlling the operation of the motor of the apparatus;

FIG. 7 is a detail view of the clutch mechanism and the long distance selector and looking in the direction of the arrows 7—7 in FIG. 6;

FIG. 8 is a detail view showing the linkage for either mechanically or manually advancing the roll of paper on which the printing is accomplished;

FIG. 9 is a further detail view of the mechanism for mechanically advancing the paper;

FIG. 10 is a detail sectional view of the apparatus for actuating the visual means whereby the telephone user can tell at a glance how long he has been using the telephone;

FIGS. 11, 12 and 13 are enlarged detail views of the solenoid actuator and cam for coupling the timer mechanism with the drive mechanism which advances the paper and also actuates the initial and final standing of time and date, returns timer and recording wheels to original position and double spaces paper between calls;

FIGS. 14 and 15 are detail views of the driving pawls which are part of the timer mechanism having a clock drive for rotating the printing elements and thereby providing current information as to when the call is made and terminated;

FIG. 16 is an enlarged detail view of the drum which provides a visual means for recording the length of time of telephone usage; and FIGS. 17 and 18 are different embodiments of wiring diagrams of systems which can be used in controlling the motors and other electrically operated components within the apparatus.

Referring now to the drawings, the information regarding a telephone usage is recorded on a roll 10 of single use carbon paper meaning a double thickness of paper with carbon on the underside of the top sheet. Any printing impressions on the surface of the paper are transferred through the carbon to the underlying sheet.

The particular kind of paper which is used for receiving the printed material is not an essential part of the present invention and I also consider well within the scope of the present invention such other impression-receiving materials as photographic film or any other impression-receiving materials as being within the scope of the invention. The roll of paper as it is provided in the embodiment is mounted on a spindle 12 and turns freely thereon, the opposite edges 14, 16 having regularly spaced perforations 18 which receive tines 20 to pull the paper off of the roll and pass it through the machine for printing at spaced intervals along the length of the paper. The tines 20 are located in circumferentially spaced relation at opposite ends of cylinder 22 which is journaled at its opposite ends 24 in side plates 26 and 28, there being a guide shield 30 (FIG. 3) which presses the paper lightly against cylinder 22 to maintain the tines in driving connection with the perforations 18. The tines are spaced apart to match the spacing of the perforations. As shown in FIG. 4, the paper is thus advanced from the roll past a soft backup roll 32 having a flat face 34 against which the paper is pressed during printing. Oppositely of the soft backup roll 32 are a series of aligned, individual printing rolls 36 which provide a line of type including information as to time, date, destination of call and other pertinent information.

The cylinder 22 is caused to rotate by each of ratchet wheels 38 (FIG. 6) and 40 (FIG. 9) and the power therefor is supplied by electric motor 42 acting through a gear reducer 44 to produce rotation of power takeoff shaft 46 and bevel gear 48 which meshes with a second bevel gear 50 of cross shaft 52 journaled at its opposite ends in plates 26 and 28. At the ends of the cross shaft 52 are cams 54 (FIG. 4) which engage cam followers 56 on the arms 60 of bellcranks 62 which are pivoted at 66, and the other arms 70 impact against the reduced diameter ends 71 of the soft backup roll which ends extend through elongated openings 76 causing it to strike the backup roll (FIG. 9) moving it and the paper toward the line of print to produce an impression on the paper. The striking action takes place after the shaft 52 moves about 90° and has stretched the springs 77 (FIG. 9) so that when the largest radius portion of the cam moves past the follower 56 the stretched spring 77 produces a sharp impact against the backup roll 32 which in turn stamps the paper against the line of type causing a clear impression between the paper and the line of type.

Following printing, the paper is then advanced, this being accomplished by the single revolution of cam 54 on shaft 52, which is rotated 360° in the direction of the arrows (FIG. 9). After the printing takes place as described, the bellcrank is in the dotted line position shown in FIG. 9 being biased there by spring 77, and the articulated pawl 78 which is pivoted at 80, an arm 82 in turn pivoted at 84 is jackknifed by spring 86 to the dotted line position in FIG. 9 when the bellcrank 62 is rotated to its dotted line position and thereby engaging the pawl 78 with a successive serration on ratchet wheel 40 so that as the cam 54 continues its rotation from about 90° to 270° this causes the bellcrank to reverse its rotation from a clockwise to counterclockwise movement, straightening the dotted line jackknife position of the pawl and rotating the ratchet wheel 40 in a paper-advancing direction. As the ratchet wheel 40 rotates it causes the cylinder 22 also to rotate and, acting through tines 20, advances the paper following printing thereon.

The process of stamping the paper to produce printing, and then advancing it, occurs each time the cradle of the telephone is lifted to start a telephone operation so that current time is stamped each time the cradle of the phone is lifted and then replaced. The ratchet wheel 38 is prevented from counter rotating by means of an idler dog 88 which is loaded by spring 90 so that the paper can be advanced only in one direction. The cylinder 22 can also be manually rotated by a knurled wheel 94 which is secured through an extension 96 (FIG. 2) so that a completely fresh section of paper can be provided following the end of a day's operation. The last operation performed is that the roll of paper is manually advanced; all stamped portions are brought out of the machine, and the paper is then cut from the roll for a complete and final reading.

*Control system*

Referring to FIG. 17, the motor 42 is energized by connection with two conductors 100 and 102 from a suitable power supply source (not shown) such that when either contact switch 104 or contact switch 106 is closed a circuit is completed for energizing the motor 42. The switch 106 has a companion switch 108 which when closed energizes solenoid 110. The switches 106 and 108 are normally open and are closed only temporarily by a delaying circuit 112 which is energized when switch 114 is closed making a circuit from conductor 100 through conductor 116, switch 114, conductor 118, resistance 120, rectifier 121 and then to parallel connected condenser 122 and relay coil 124 and thereafter through conductor 126 to conductor 102. The action of the holding circuit 112 is to hold switch 108 temporarily closed for a longer period of time than the closure period of switch 114. A circuit is thereby maintained temporarily through closed switch 106 to the motor 42 whereby the motor 42 can turn the shaft 52 sufficiently to effect a mechanical closing of switch 104 after about 5° rotation of the shaft 52 and which remains closed to allow the motor 42 one complete revolution of the shaft 52 before the mechanical switch 104 is then opened, deenergizing the motor 42.

Figure 1:
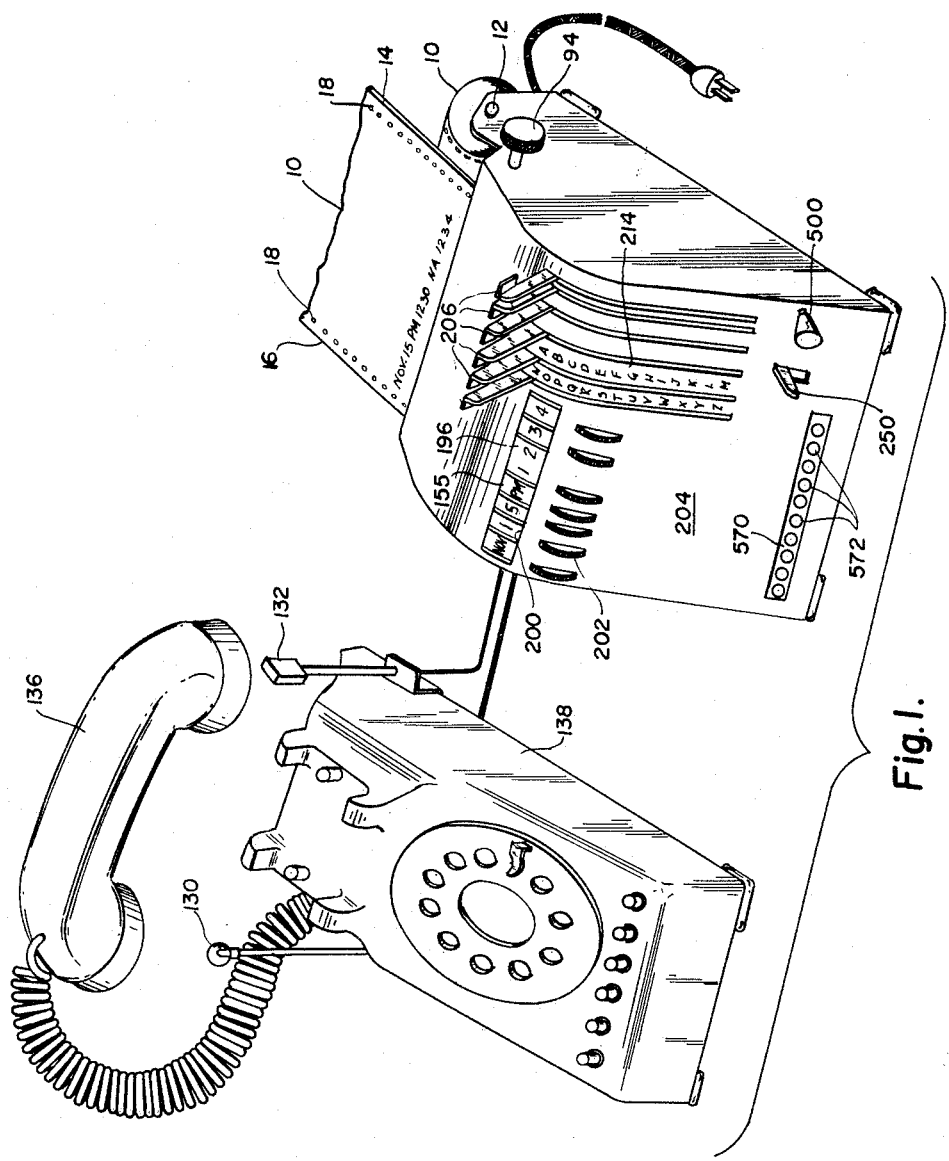
FIGURE 1 is an isometric view of the invention as it appears in usage, and is installed in this instance on a desk telephone.

During operation of the apparatus, there is continuously energized a light source 130, the light energy being beamed to a photocell 132 which when energized by light effects opening of the switch in conductor 134 interrupting a circuit from conductor 100 to conductor 102 through conductor 134. The light 130 and photocell 132 are located so that when the cradle 136 of telephone 138 (FIG. 1) is lifted or lowered, the light beam is interrupted and photocell 132 is deenergized to close a switch (not shown) in conductor 134 and thereby energize solenoid 136 to close the switch 114 and initiate a printing-and-paper-advancing cycle.

When the cradle 136 is returned to its position on the telephone 138 the light source is again interrupted so that switch 114 is again closed, motor 42 reenergized and run for a time sufficient to effect one complete revolution of the shaft 52 to cause a second complete cycling of print-and-paper-advancement.

In place of the photocell 132 and light 130, a switch 132' can be used which clips onto the phone below the cradle and is actuated to closed position when the cradle is laid in rest position. The circuit for controlling the apparatus when a switch 132' is used is shown in FIG. 18.

The contact switch 104 (FIG. 17) is operated by a switch arm 146 (FIG. 6) pivoted at 148 by a leaf spring 151 in a direction providing that the switch 104 is normally open. At the end of switch arm 146 is a cam follower 150 which bears against the outer periphery of a circular cam 152 having a notch 154, the follower 150 of the arm 146 fitting into the notch at the beginning and end of each cycle of operation of the motor 42 to maintain the switch 104 normally open. The cam 152 is carried by and turned by the shaft 52 which is rotated as an output of the motor 42. Once the follower 150 bears against the unnotched, smooth outer periphery 152 the arm 146 is biased sufficiently upwardly against the resistance of the leaf spring to close switch 104. Since the motor is started and held momentarily by the holding circuit 112 when the illumination of light bulb 130 is interrupted, the motor is held energized through closure of switch 106 (FIG. 17)

long enough to permit rotation of the shaft 52 such that follower 150 in the switch arm is brought to the outer periphery of the cam 152 and thereafter switch 104 is closed to maintain the motor 42 energized even after the switch 106 is opened, the motor 42 being then under the control of switch 104 will remain energized until the cam 152 is rotated 360° and the cam follower 150 drops into the notch 154 to open the switch 104 and shut off the motor 42. In this manner, the control provides one cycle of printing-and-paper-advancing each time the telephone is used at the beginning and ending of said usage.

A clock motor 153 (FIG. 17) runs continuously to operate a timer mechanism having a visible dial face 155 (FIG. 1) which registers the current time and this takes place independently. The apparatus thus serves as a timepiece in addition to its other functions of recording and maintaining a history of telephone usage. There is also included in the circuit a light 157 which is normally off and is controlled by a normally open contact switch 159 which is closed only during long distance operation so that the light 157 will provide illumination for a member providing visible means measuring the length of a long distance call, this structure being later described.

Printing selection

The first requisite to accurate record keeping is that of providing proper notation of time, this being accomplished through the timer motor 153, said motor 153 having an output shaft 161 (FIG. 14) which rotates one revolution per minute and includes at the end thereof a cam 163 which pivots a rocker arm 165 through one reciprocation per minute, said rocking arm 165 having a push rod 167 with a dog 169 advancing ratchet wheel 171 one increment each minute. The ratchet wheel 171 can be turned freely relatively to the dog 169 in one direction but serves as a driving connection in the opposite direction causing 36° of movement on the ratchet wheel 171 each minute or one complete revolution every ten minutes. The ratchet wheel 171 is secured to printing roll 36 having embossed numerals 0 to 9 located in numerical order around the periphery thereof so that the clock motor advances the printing roll 36 by units of one progressively from 0 to 9, then to 0 again bringing in turn successive numerical values in numerical order on the units roll 36 until the dog 169 enters notch 170 between the 9 and 0 value and turning adjacent dog 173 to advance it by one increment changing the tens value so that minutes are recorded from 0 to 5 and 0–5 and then the tens column dog, after reaching 5 causes the next adjacent dog which is in driving connection with the hour roll to be advanced after the units and tens indicators have progressed 0 through 59 minutes. The hours roll can in turn be geared into an "A.M."-"P.M." roll and this roll in turn suitably geared with a day and month printing roll. In this manner, the current time including minutes, hour, meridian, day and month is provided as printing indicia which constantly records current time with the printing embossments bearing the appropriate numerical and alphabetical characters.

The ratchet wheels in addition to driving the associated printing rolls also drive gear wheels 180 (FIG. 3) meshing with other gear wheels 184 mounted on shaft 186. Each gear wheel has a larger diameter dial 192 having spaced characters 196 on the periphery thereof which are visible through a window 200 (FIG. 1) of the apparatus and correspond with whatever character is in printing position on the printing roll. Therefore, whatever is read at the dial face 196 will be printed on the sheet of paper.

The dial wheels can each be separately adjusted by turning an associated wheel 202 having a knurled edge projecting beyond the front casing 204 of the apparatus and mounted for independent movement on shaft 194 to drive its dial wheel through the gear wheels 184. Each dial wheel can be independently moved by turning wheel 202 in a direction effecting movement of the printing wheel and its associated ratchet wheel such that the associated dogs 169, 173, etc. will ratchet freely. In the opposite direction the dogs will effect locking connections through the clock drive mechanism; but, in the opposite direction ratcheting movement takes place freely. In this way, adjustment can be effected of the dial wheel and the printing rolls but without disturbing the operative connection of the clock drive mechanism. Moreover, each dial and printing roll can be separately and independently adjusted, without disturbing its clock drive mechanism and after the adjustment is made the clock drive will continue to operate, resuming a running time with whatever value is set on the dial face and printing wheel. Following adjustment, the printing rolls will present a line of type which still corresponds with that on the dial face.

In addition to the time information, it is valuable to have additional information such as the knowledge of destination of the call, person called, etc. This information can be provided in the form of printed letters which accompany the time and are obtainable by means of a series of keys 206 each having an arm 207 which is suitably stepped (FIG. 2) and is secured at 209 (FIG. 4) to a printing wheel 211 journaled on a shaft 213. At the face 215 of each printing wheel 211 are a number of spaced characters 212 which form a part of the line of type depending on the angular disposition of the printing wheel. The particular character which becomes a part of the line of type corresponds with alphabetical or numerical value on the face 214 (FIG. 1) opposite the key setting. Thus, each key is separately and independently depressed until the arm registers with the corresponding printing character at the face 214. Each key 206 and its associated arm 207 has an associated torsion spring 230 biasing it to a non-printing position, i.e., the position shown in FIG. 4 and when the key is depressed it is against the resistance of the torsion spring 230. The selected position of the key is held by a pawl 232 which enters one or the other of the serrations 234, the pawl being held in locked position by a small coil spring 236, there being a pawl 232 for each of the keys. Should the operator desire to change the setting of the keys manually he depresses the clearing key 250 which projects outwardly of the case thereby rotating lever 252 about pivot 254 and causing bar 256 to engage each of the pawls associated with each of the keys 206 rotating them clockwise (FIG. 4) and disengaging their locking relation with the serrations 234 whereby springs 230 will rotate each key to a cleared position and the operator can then reselect the keyed information. The clearing key 250, when not manually depressed, is insufficient to overcome the resistance of springs 236 which urge the pawl to a locking position.

The keyboard is also cleared automatically at the end of each call by means of a lifting cam 260 (FIG. 6) rotated on pivot 262 by a push rod 264, said cam 260 being turned clockwise (FIG. 6) to raise the bar 256 and thereby pivot each locking pawl 232 out of locking engagement with the respective serrations 234 of each printing wheel 211.

At the start of each telephone call, the parts are positioned as shown in full line position in FIG. 6 and when the shaft 52 (FIGS. 5, 6) is rotated one revolution the crank 290 is rotated and end 292 thereof engages and rotates lever 294 about its pivot 296 causing the hook end 298 to pivot to the full line position and become interlocked with the hook 300 of lever 302, the described turning of lever 298 being against the resistance of a spring 299. This arcuate movement of lever 294 displaces rod 264 and lifts cam 260 to its full line position, thereby clearing the keyboard. The lift cam 260 then passes beyond the clearing key 250 and the clearing key is then in the position shown in FIG. 6 and the locking pawls 232 are then operative to hold the selected keys in position, selection being made before or after the cradle of the phone is lifted.

At the end of each call, the lever 302 is turned counterclockwise (FIG. 6) on its pivot 303 at the very outset so that it thus releases its hook connection with lever 294 which is spring biased to rotate clockwise on pivot 296, returning the lift cam 260 from its full line to dotted line position. As previously described, a full revolution of shaft 52 takes place, causing crank 290 to rotate so that end 292 engages lever 294 and rocks it counterclockwise, lifting cam 260 from dotted line to full line position, lifting the clearing rod 256 and releasing the keys.

The lever 302 can be cammed counterclockwise by engagement of its hook end with the hook end of lever 294 as the lever 294 moves from dotted line to full line position first causing the lever 302 to move counterclockwise on its pivot 303 and then interlocking with said lever 302 through its hook end.

*Auxiliary paper-advancing system*

In order to isolate the data for each telephone call, it is necessary to provide an interval of spacing on the paper for each call so that the data appearing on the paper is grouped for a respective call. For this reason, there is a substantial interval of unmarked paper between successive calls in order to isolate the data which appears as distinct groupings spaced along the length of the paper. In this way, the likelihood of confusion from running the data together from individual calls is reduced. There is, in addition to the action of cam 54, acting through ratchet wheel 40, (FIG. 9) a means for advancing the paper through lever 294 (FIG. 6) each time it is caused to rock by the crank 290, said lever 294 being fastened through a bellcrank arm 320 to a push rod 342 acting through a lever 346 which operates a jackknife linkage 360 including a pawl 362 engaging the serrations of ratchet wheel 38. Each time the lever 294 is swung to its dotted line position the jackknife linkage 360 advances the ratchet 38 and is opened to dotted line position. The rotating ratchet wheel advances the paper. The paper advancement obtained by crank 290, lever 294, jackknife linkage 360 and ratchet wheel 40 occurs after first 45° or so angular increment of shaft 52 and before the cam 54 is effective to rotate lever 70 counterclockwise (FIG. 9) and then release from engagement with the follower 56, permitting spring 77 to bias the lever 60 clockwise on its pivot 66 (FIG. 9) to the dotted line position and thereby operate ratchet wheel 40; thus, the paper is advanced first by ratchet wheel 38 and then by ratchet wheel 40, the two operations occurring sequentially. The ratchet 40 is operative at the beginning and ending of each call i.e. each time the shaft 52 rotates. Note that at the end of the call the printing occurs first and then the paper is advanced first through ratchet wheel 38 and then by ratchet wheel 40 so that there is a substantial interval of unmarked paper between printings of respective telephone calls, thereby reducing the likelihood of running the data together. Whereas the ratchet 40 is operative each time the shaft rotates, the ratchet 38 is effective only when lever 294 is turned counterclockwise, this occurring at the end of a call.

Both at the beginning and end of each telephone conversation, solenoid 110 is energized to reciprocate plunger 390 (FIG. 11) connected through a pin 392 with a lever 394 mounted on stem 396 and pivoted thereon through a reduced diameter end 398 (FIG. 12). Both the plunger 390 and stem 396 are connected to the lever 394 through elongated openings 400 and 402 to permit limited longitudinal movement of the lever 394. When the lever 394 is pivoted its tooth 404 engages one of eight equally spaced teeth 406 (FIGS. 11, 12) and the wheel 430 is rotated one-eighth of a revolution. It is so provided that at the end of each telephone call the end 433 of lever 302 (FIG. 6) is located as indicated in FIG. 11 against one of the four equally spaced cams 432 which overlie the eight teeth 439 so that when the solenoid 110 is again operated one of the four cams 432 will trip the end of the lever 302 and release locking connection with lever 294 which is spring biased in a clockwise direction (FIG. 6) to clear the keyboard and advance the paper through ratchet wheel 38 as before described. The proper position of the wheel 430 following each operation of the solenoid is assured by a locating wheel 460 having eight equally spaced indentations or dimples 462 which are engaged by a ball 464 biased by spring 466 (FIGS. 11, 12) and which thereby assures proper location of the cam following each operation by the solenoid. In this way, the four cams 432 are made to be in proper contact with the end 433 of the lever 302 to effect tripping thereof at each alternating operation of the solenoid, each said alternating operation taking place at the end of the telephone message.

The structure described is suitable to provide a complete record of telephone operations both local and long distance and is effective to monitor both incoming and outgoing calls. For example, when it is desired to make a long distance call the keys 206 can be positioned to provide a letter code signalling long distance destination, and party and the apparatus will stamp both at the beginning and ending of the telephone call information as to when the call was placed, when it was terminated, and from this the duration of the call can be calculated. Stamping takes place once at the beginning and once at the end of each call and the paper is advanced one increment between start and finish of a given telephone message to keep the printings from being superimposed; and then, between successive telephone messages there is a substantial advance of paper, greater than that occurring between the printings at the beginning and ending of the telephone call so that the information from one telephone message to the next does not run together. The printing can also be caused to take place once each minute during a long distance call with a spacing provided between each stamping obtained by operation of ratchet wheel 40 only.

*Operation of the apparatus*

In operation, the machine is supplied with a roll 10 of one use carbon paper (FIG. 4) which is passed between backup roll 32 and printing rolls 36 having numerical embossment values which print current time and are then passed over the cylinder 22 so that the perforations at the opposite edges of the paper register with tines 20 by means of which the paper is pulled through the apparatus. The machine is continuously running, that is, it is connected with a suitable voltage source so that the timer mechanism is powered continuously by the clock motor 153 (FIG. 17) and the clock motor 153 continuously operates the printing rolls through an escapement which includes lever 165, rod 167, dog 169, gear wheel 171, dog 173, etc. The printing rolls include numerals for minutes, hours, days, etc. and the clock drive maintains current hourly time and calendar time. Additionally, the printing rolls are each geared to the dial wheels which are visible and which can be read through the window of the apparatus to provide both calendar time and hourly time for the convenience of the user. Since the dial time and printing wheel time are geared together and are identical, the user is aware of what will be printed at each instance should the apparatus be operated and if the time should need some adjustment, each of the printing rolls, which is synchronized with the dial wheel can be separately and individually adjusted by turning an associated adjustment wheel 202 which will turn the dial to the desired position and concurrently turn the associated printing roll, this being performable in one direction only by overriding the dog and ratchet wheel of the clock drive mechanism.

Therefore, adjustments can be provided of the printing at any time without disturbing the clock drive mechanism. The user is thereby assured of an accurate, adjustable timepiece and printing apparatus which will print whatever time and date appears on the face of the visible dial.

Assume the user then wishes to place a local or a long distance call. He merely picks up the cradle of the phone; in doing so his hand sweeps across the path of light beam 130, this being sensed by the photocell 132 which then causes a circuit to be made through conductor 134 (FIG. 17) energizing solenoid 136, closing contacts 114 and energizing holding circuit 112 which in turn closes the double switch 106, 108 which completes a circuit, energizing solenoid 110 and momentarily energizing motor 42 through switch 106, these occurrences producing first printing and then advancing of the paper, as will next be explained.

When the motor 42 is first operated through switch 106 producing rotation of shaft 52 through bevel gears 48, 50, the circular cam 152 immediately biases the switch arm 146 upwardly to hold the switch 104 closed for a full 360° movement of the shaft 52. Actuation of the motor beyond the first instant is thus transferred from switch 106, which is delayed slightly, to switch 104. The follower 150 on the switch arm will reenter the notch 154 on the circular cam permitting the leaf spring 151 to bias the arm 146 downwardly and reopen switch 104 to deactuate motor 42 thus assuring only one revolution of the shaft 52 at the beginning of each telephone usage.

Depending upon whether the user wishes to record a local or long distance call he selects, through the keys 206, suitable alphabetical and numerical information on the keyboard coded according to a prearranged system to provide further information with respect to each call.

After the cradle is lifted and the key positions selected, the keys are locked in their selected angular positions so that the operator by looking at the window 155 and keyboard knows what will be printed on the sheet.

As the shaft 52 rotates the cam 54 (FIG. 4) engages follower 56 of the bellcrank 60 (FIG. 8) and causes it to turn angularly on rock shaft 66, stretching spring 77 so that when the cam 54 momentarily disengages from the follower 56 will bias the bellcranks against the soft backup roll causing it to impact sharply thereagainst and the impact will in turn strike the backup roll and paper against the printing line including time data provided by the time rolls 36 and whatever additional information is selected from the printing keys. Once the bellcrank 70 moves to its dotted line position to effect printing (FIG. 9) the levers 80, 82 jackknife to the dotted line causing the pawl 78 to engage a successive serration of the ratchet wheel 40. As the cam 54 continues to rotate the bellcrank is then reverse pivoted in the dotted line arrow direction (FIG. 9), this time straightening the jackknife from dotted line to full line position against the resistance of spring 86 and in doing so rotates the ratchet wheel 40 and cylinder 22 advancing the paper.

The soft backup roll is mounted for floating movement and, being no longer biased by the bellcrank, offers no resistance to passage of the paper after the printing operation is completed.

The solenoid 110 which is energized at the beginning of the telephone usage rotates the wheel 430 one-eighth of a revolution but nothing functionally is accomplished by the solenoid other than this. If the lever 294 is not in locked position with lever 148 it is contacted by cam 292 of crank 290 and pivoted to an angular position producing an interlocking of levers 294 and 302 through their hook ends; and, in the process of so doing it will move the push rod 264 toward the left and rotate the lifting finger 260 and cause rod 256 to rotate each locking pawl clockwise (FIG. 6) thereby releasing the keys to insure a clear keyboard so that none of the information from the previous call can be inadvertently carried through to a succeeding call. Also, the lever 294 in rotating from dotted line position to full line position forces push rod 342 (FIG. 6) upwardly rotating lever 346 and straightening the jackknife connection 360 with ratchet wheel 38 to produce turning of the roll 44 and advance the paper.

Operation of the ratchet wheel 38 by lever 294 and crank 290 is coordinated with operation of the ratchet wheel 40 by the cam 54 so that advancements of the paper take place sequentially with the printing operation occurring first. At the onset of each call the lever 295 is already in locked position so that the crank 290 moves idly by the lever 296 with the result being that there is no clearing of the keys and no advancement of the paper by operation of the ratchet wheel 38.

During the call, the clock motor 153 continues to run and lapsed time is measured by the degree of change in position of the minute and hour printing rolls which occurs during the call; thus, when the printing operation is performed at the end of the call, and the time of termination is recorded, the time period of the call is obtainable by noting the lapsed time from printing values of the start and finish of the call. The information supplied from alphabetical indicia on wheels 211 relates the time and date information to the party and transaction, thereby forming a basis for business records and charges.

At the end of the call, when the operator returns the cradle to the telephone his hand again sweeps across the light beam obtained from source of illumination 130, this being sensed by the photocell 132 which energizes solenoid 136 by producing a circuit through conductor 134 and thereby closing switch 114 to produce a circuit from conductor 116 to the holding circuit 112 which, in turn, closes switches 106 and 108. Switch 108 completes a circuit energizing solenoid 110 and switch 106 produces a circuit energizing motor 42. As motor 42 is energized the shaft 52 is again started on a one revolution operation and in so doing it again produces a first printing and then advancement of the paper.

When the solenoid 110 is energized at the end of the call, the wheel 430 (FIG. 12) is rotated one-eighth of a revolution, it being provided that while the phone is in usage the end 433 of the elevator 302 is in engagement with one of the four embossments 432 (FIGS. 11, 12) so that the lever 302 is tripped at the end of each telephone call and in so doing disengages its hooked end 340 (FIG. 6) with the complementary hooked end 298 of lever 294 and a spring (not shown) biases the lever 294 clockwise on 296 causing the jackknife lever 346 to be cocked from the full line to the dotted line position shown in FIG. 6 wherein the tooth 362 engages a new serration.

After the shaft 52 has rotated about 60° at the end of the telephone call the cam 54 has loaded springs 77 (FIG. 9) and snap released levers 70 to effect printing by impacting the roll 32 and paper 10 against the printing rolls 36. In the next 15° of shaft 52 rotation, the cam 292 at the end of crank 290 engages the lever 294 reversing its pivotal movement, this time against the resistance of a spring (not shown) in a counterclockwise direction about 296 (FIG. 6), the jackknife connection with ratchet wheel 38 straightening so that the pawl 362 and rachet wheel 38 will advance the paper. Also, the rod 264 lifts finger 260 pivoting it clockwise (FIG. 6) responsively to movement of the lever from dotted line to full line position by the crank arm 290 and this has the effect of lifting the locking pawls 232 (FIG. 4) out of engagement with the teeth 234 (FIG. 3) of the printing wheels and allowing the torsion springs 230 to return the printing wheels to a retracted position.

As the crank 290 continues to rotate it will return the lever 294 to a locked position with lever 292 so that at the outset of the next succeeding call the levers 294 and 302 are locked together. As the shaft 52 rotates further, the cam 54 (FIG. 9) acting through its associated bellcrank will produce a rotation of ratchet wheel 40, the paper being advanced at the end of each call first by ratchet 38 and then by ratchet 40 so that there is a double spacing on the paper between calls. The usual spacing between the beginning and ending printings for a given call is by operation of ratchet wheel 40 and the spacing between successive calls is provided by operation of both ratchet wheel 38 and ratchet wheel 40. This spacing of information precludes running together of information from one call to the next.

*Special long distance operation*

While a complete, accurate collection of data can be had from the operation of the mechanism thus far described, it is sometimes convenient to have a more precise record of long distance calls since toll charges are at times based upon the moment of reaching the party and it is therefore desirable to have an instantaneous recording of time at which the toll charge begins. The apparatus can be provisioned with this additional means, as well as means which will apprise the user of how long he has conducted a long distance call. Both these provisions tend to make the user more time conscious and therefore effect a more economical usage of long distance calls.

For long distance calls, I use a starting button 500 which is depressed at the time the party is reached and the toll charge commences. When the button 500 is depressed the shaft 502 is biased downwardly (FIGS. 6, 7) causing the inclined cam face 504 to bias the lever 506 about its fulcrum 508 and engage the cam disk 510 with the complementary cam disk 512, the two cams interlocking through matching serrations 513. The two cams are normally held apart by a spring 514 compressed therebetween.

The cam disk 512 connected to shaft 516 (FIG. 5) is continuously rotated at the rate of one revolution per minute through a suitable gear train 518 which is connected with the clock motor 153. The starting angular position of the cam disk 510 is always as shown in FIG. 6 so that during the first few degrees of angular movement of the cam disk 510 the nib 520 engages the end of lever arm 146 actuating switch 104 which causes the motor 42 to become energized and produces a printing-and-paper-advancing operation, the paper advancing occurring through operation of ratchet 40 only.

As long as the long distance call continues and button 500 is depressed, the clutch disk 512 and therefore clutch disk 510 continues to rotate at the rate of one revolution per minute and at the end of each revolution the nib 520 recontacts the switch arm 146 and repeats a printing-and-paper-advancing cycle. Immediately on the record of the paper, the regular one minute spaced intervals of printings call attention to the fact that a long distance call is recorded and emphasize such fact as a part of the record.

The shaft 502 is held in a locked position against the resistance of spring 521 by reason of the tooth 530 which engages a complementary tooth 534 at the end of rocker arm 536. The rocker arm 536 is pivoted at the end of a call by operation of solenoid 110. The rocker 536 is held normally in the position shown in FIG. 6 by a spring (not shown) biasing it clockwise to that position. At the end of the long distance call and when the solenoid 110 is energized, the end 433 of lever 302 is tripped by one of the four cams 432 (FIG. 11), said lever 302 being rotated counterclockwise on its pivot (FIG. 6) so that the rod 540 rotates cam 542 counterclockwise, thereby rotating the lever 536 counterclockwise on rock shaft 544 and releasing connection 534 with the end 530 of rod 502. Spring 521 then biases the shaft retractively to permit disengagement of cam disks 510, 512. The cam disk 510 will however continue to rotate with cam disk 512 until nib 520 is returned to its starting position (FIG. 6) at which time a notch 550 (FIG. 7A) on cam disk 510 snaps against lever 508 permitting complete disengagement of the serrations 513 of the two cam disks 510, 512 and upon their complete separation no further angular movement is produced of cam disk 510 by disk 512, this always taking place as the nib 520 on disk 510 (FIG. 6) is just in position to reactuate the lever arm controlling switch 104.

In this way, always at the start of a long distance call when the button 500 is depressed there is an immediate recording of the initial time so that the onset of toll charge is accurately recorded. Since the telephone charges are such that the user must pay for fractions of minutes the same as completed minutes, the record of charge takes this into account by recording fractions of minutes as a double stamping of the same minute at which the call is ended. I therefore calculated each stamped minute as a full minute of use.

Thus, assuming that a long distance call is initiated at 9:11 the button 500 when depressed will cause an immediate stamping at time 9:11, and at the end of say three minutes, 20 seconds the nib 520 has caused stampings at 9:11, 9:12, 9:13 and 9:14. For the fraction of minute representing 20 seconds, before the nib has completed revolution, and the telephone is hung up, there will be an ending stamp, in this case a restamping of 9:14. The double recording of 9:14 is not added as a further minute however.

When the shaft 502 is depressed the switch 159 (FIG. 17) is closed thereby turning on light 157 which is located within a drum 570 having openings 572 spaced so that as the drum rotates first one opening is illuminated and then a row of two is brought into the illuminating area and is made visible and successively three openings, four openings, etc. across the length of the drum. As specifically illustrated, the drum 570 is provided with ten rows of openings 572 and therefore will indicate a maximum of ten minutes of conversation whereupon the cycle is repeated. Hence the drum is caused to rotate one-tenth of a revolution per minute by means of power take-off rolls 574, 576, these rolls being rubber covered and providing a power transfer from shaft 516 to the continuously running roll 580 thence to 576, roll 574, then the illuminated drum 570. It should be evident that the drum 570 could be provided with any number of rows of the openings 572, for example, $n$ of the openings 572. In this case the drum would be rotated $1/n$ of a revolution per minute.

From beginning to end, the telephone user is made aware of the passage of time by the succession of illuminated openings which appear at the front end of the apparatus appearing as an increasing length of lighted dots or openings which record each minute of use, one illuminated opening for each minute. The user then knows at a glance the extent of use. The greater awareness of time usage, which is thereby produced, has the effect of making the telephone conversation shorter and therefore more economical.

When the long distance call is terminated the telephone user hangs up the phone, the switch 146 is biased to open position turning off light 144 and the drum 574 is rotated to its starting position. When the roll 574 is lifted out of contact with 570 and 576 the continuously rotating gear 576 is disconnected from drum 570 at the end of the call. It is also possible to make a positive gear connection between the clock drive and drum 570 if this is desired. Following each call the interior light 157 is turned off and the drum 570 is rotated to starting position by a spring or in any other suitable position.

At the end of the long distance telephone call the entire system is deactuated the same as described for local call usage.

Although the present invention has been described in connection with a single example embodiment it will be understood that this is exemplary of the invention and is by no means restricted to this example embodiment. It is reasonably to be expected that those skilled in this art can make numerous revisions and adaptations of the invention to meet individual design requirements and it is intended that such revisions which incorporate the herein disclosed principles will be included within the scope of the following claims as equivalents of the invention.

I claim as my invention:

1. In apparatus for recording the duration of telephone use, the combination comprising: extrinsic sensing means mounted on a telephone for sensing the initiation and the termination of the use of said telephone; motor means operable by said sensing means only at the initiation and the termination of the use of said telephone; printing means for printing information relating to the use of said telephone; strip material supported adjacent to said printing means; means connected with said motor means for bringing into engagement said printing means and said strip material whereby the information carried by said printing means is printed on said strip material; and advancing means driven by said motor means for moving said strip material through a predetermined distance after each printing operation.

2. In apparatus for recording the duration of telephone use, the combination comprising: sensing means mounted on a telephone for sensing the initiation and the termination of the use of said telephone; motor means operable by said sensing means at both the initiation and the termination of the use of said telephone; printing means for printing information relating to the use of said telephone; strip material supported adjacent to said printing means; means connected with said motor means for bringing into engagement said printing means and said strip material whereby the information carried by said printing means is printed on said strip material; first advancing means driven by said motor means and operable after the printing operation corresponding with the initiation of the use of said telephone for advancing said strip material through a first predetermined distance; and second advancing means driven by said motor means and operable after the printing operation corresponding with the termination of the use of said telephone for advancing said strip material through a second predetermined distance which is greater than said first predetermined distance.

3. In apparatus for recording the duration of telephone use, the combination comprising: extrinsic sensing means mounted on a telephone for sensing the initiation and the termination of the use of said telephone; motor means operable by said sensing means at both the initiation and termination of the use of said telephone; a plurality of adjustable printing elements each including printing characters; strip material supported adjacent to said printing elements; means connected with said motor means for bringing into engagement said printing elements and said strip material whereby the information carried by said printing elements is printed on said strip material; advancing means driven by said motor means for moving said strip material through a predetermined distance after each printing operation; and a timer mechanism connected with some of said printing elements for timed rotation thereof, said some of said printing elements serving both to indicate and print current time.

4. In apparatus for recording the duration of telephone use, the combination comprising: extrinsic sensing means mounted on a telephone for sensing the initiation and the termination of the use of said telephone; motor means operable by said sensing means at both the initiation and the termination of the use of said telephone; printing means for printing information relating to the use of said telephone; strip material supported adjacent to said printing means; means for displacing said strip material into engagement with said printing means only at the initiation and the termination of the use of said telephone for recording the information carried by said printing means; and advancing means driven by said motor means for moving said strip material through a predetermined distance after each printing operation.

5. In apparatus for recording the duration of telephone use, the combination comprising: extrinsic sensing means mounted on a telephone for sensing the initiation and the termination of the use of said telephone; motor means; electrical circuit means including switch means for energizing and deenergizing said motor means; means for controlling said switch means to energize and deenergize said motor means at both the initiation and termination of the use of said telephone; printing means for printing information relating to the use of said telephone; strip material supported adjacent to said printing means; means connected with said motor means for bringing into engagement said printing means and said strip material whereby the information carried by said printing means is printed on said strip material; and advancing means driven by said motor means for moving said strip material through a predetermined distance after each printing operation.

6. In apparatus for recording the duration of telephone use, the combination comprising: extrinsic sensing means mounted on a telephone for sensing the initiation and the termination of the use of said telephone; motor means; electrical circuit means including switch means for energizing and deenergizing said motor means; cam means for controlling said switch means to energize and deenergize said motor means at both the initiation and termination of the use of said telephone; printing means for printing information relating to the use of said telephone; strip material supported adjacent to said printing means; means connected with said motor means for bringing into engagement said printing means and said strip material whereby the information carried by said printing means is printed on said strip material; and advancing means driven by said motor means for moving said strip material through a predetermined distance after each printing operation.

7. In apparatus for recording the duration of telephone use, the combination comprising: a substantially continuous roll of paper; motor means; advancing means operable by said motor means for advancing said paper to provide spaces on which information relating to the use of a telephone is printed; printing means for printing information on said spaces during each operation of said motor means; electrical circuit means including a switch for controlling the operation of said motor means; sensing means mounted on the telephone for sensing the initiation and the termination of the use of said telephone, said sensing means actuating said switch to effect energization of said motor means; a timer mechanism having a clock drive providing operation of said timer mechanism in accordance with a predetermined time schedule; clutch means driven by said timer mechanism; and means forming a part of said clutch means for reactuating said switch once during equal intervals of time whereby said motor means is reenergized once during each of said intervals of time to effect printing of information at spaced points along said roll of paper.

8. The combination of claim 7 including means for engaging said clutch means when desired.

9. The combination of claim 7 including means for disengaging said clutch means at the termination of the use of said telephone.

10. The combination of claim 7 including a drum having $n$ rows of equally spaced openings along the length thereof, the first row having one of said openings and each succeeding row having one more of said openings than the preceding row; a light source disposed within said drum; cover means having openings registrable with the openings in said drum; drive means for rotating said drum at $1/n$ of a revolution during each of said intervals of time whereby one more of said openings is visible at the end of each $1/n$ of a revolution of said drum.

11. In apparatus for recording the duration of telephone use, the combination comprising: strip material; printing means for printing information relating to the use of a telephone; extrinsic sensing means mounted on a telephone for sensing the initiation and the termination of the use of said telephone; means for initiating a printing operation whereby the information carried by said printing means is printed on said strip material; motor means energized by said sensing means for displacing said strip material to provide a surface for each item of recorded information; and control means responsive to the energization of said motor means for deenergizing said motor means upon operation thereof for a period of time sufficient for the completion of a printing operation and the advancement of said strip material.

References Cited by the Examiner

UNITED STATES PATENTS

| | | | |
|---|---|---|---|
| 840,718 | 1/07 | Shoemaker | 179—7 |
| 2,014,525 | 9/35 | Goodrum | 179—7.1 |
| 2,015,783 | 10/35 | Broder | 179—7.1 |
| 2,040,588 | 5/36 | Zoller | 179—7.1 |
| 2,095,298 | 10/37 | Tauschek | 179—7.1 |
| 2,182,634 | 12/39 | Krum | 178—27 |
| 2,588,935 | 3/52 | Oran | 179—7 X |
| 2,609,045 | 9/52 | Kaiser | 179—7.1 X |
| 2,687,937 | 8/54 | Cooper et al. | 346—50 |
| 2,703,268 | 3/55 | Rixford et al. | 346—81 |
| 2,730,425 | 1/56 | Braatz | 346—78 |

ROBERT H. ROSE, *Primary Examiner.*

WALTER L. LYNDE, *Examiner.*